(12) United States Patent
Ellis et al.

(10) Patent No.: US 10,761,567 B2
(45) Date of Patent: Sep. 1, 2020

(54) REMOVABLE FACIAL INTERFACE FOR HEAD-MOUNT DISPLAY

(71) Applicant: Facebook Technologies, LLC, Menlo Park, CA (US)

(72) Inventors: Shane Michael Ellis, Bellevue, WA (US); Joseph Patrick Sullivan, Seattle, WA (US)

(73) Assignee: Facebook Technologies, LLC, Menlo Park, CA (US)

( * ) Notice: Subject to any disclaimer, the term of this patent is extended or adjusted under 35 U.S.C. 154(b) by 13 days.

(21) Appl. No.: 15/669,567

(22) Filed: Aug. 4, 2017

(65) Prior Publication Data

US 2019/0041899 A1    Feb. 7, 2019

(51) Int. Cl.
*G06F 1/16* (2006.01)
*A45F 5/00* (2006.01)
*G02B 27/01* (2006.01)

(52) U.S. Cl.
CPC .............. *G06F 1/163* (2013.01); *A45F 5/00* (2013.01); *G02B 27/0172* (2013.01); *G02B 27/0176* (2013.01); *A45F 2200/0516* (2013.01); *A45F 2200/0533* (2013.01)

(58) Field of Classification Search
CPC .. G06F 1/163; G02B 27/0176; G02B 27/0172
USPC .................................................. 361/169.03
See application file for complete search history.

(56) References Cited

U.S. PATENT DOCUMENTS

| | | | |
|---|---|---|---|
| 9,989,998 B1 * | 6/2018 | Yee | G06F 1/163 |
| 10,085,004 B2 * | 9/2018 | Tempel | H04N 13/344 |
| 10,133,305 B1 * | 11/2018 | Sullivan | G06F 1/163 |
| 10,209,524 B2 * | 2/2019 | Drinkwater | G02B 27/0176 |
| 10,496,130 B1 * | 12/2019 | Yee | F16M 13/04 |
| 2006/0179554 A1 * | 8/2006 | Barton | A61F 9/026 2/426 |
| 2017/0192198 A1 * | 7/2017 | Bristol | G02B 7/12 |
| 2017/0307787 A1 * | 10/2017 | Kawamura | G02B 27/0172 |
| 2018/0095498 A1 * | 4/2018 | Raffle | G02B 27/0176 |
| 2018/0210492 A1 * | 7/2018 | Chen | F04B 49/06 |

FOREIGN PATENT DOCUMENTS

| | | | | |
|---|---|---|---|---|
| CN | 105388614 A | | 3/2016 | |
| EP | 2990853 A2 * | | 3/2016 | G02B 27/0176 |

OTHER PUBLICATIONS

Chinese National Intellectual Property Administration, Office Action, Chinese Application No. 201810876038.3, dated Jul. 3, 2020, 10 pages.

* cited by examiner

*Primary Examiner* — Nidhi Thaker
(74) *Attorney, Agent, or Firm* — Fenwick & West LLP

(57) ABSTRACT

Embodiments relate to a facial interface in a head-mount display. The facial interface assembly is comprised of three separate layers of various materials that are contoured to assemble into a removable facial interface that may be replaced in the event that it becomes worn due to use. The facial interface assembly is composed of a periphery frame, a semi-rigid frame, and facial interface foam. These three layers are of varying rigidity, and support contours designed to fit together in a flush manner comprising a removable facial interface assembly.

15 Claims, 5 Drawing Sheets

REMOVABLE FACIAL INTERFACE FOR HEAD-MOUNT DISPLAY

BACKGROUND

The present disclosure relates to a head-mounted display (HMD), and specifically, to a facial interface in a HMD.

Head-mounted displays may be used to present augmented and/or virtual information to a user. For example, a virtual reality (VR) headset can be used to simulate virtual environments. HMDs are used in a variety of fields, some of these include gaming, engineering, medicine, and aviation.

Because a HMD is designed to be worn on a user's head, it typically includes a region that makes physical contact with the user's face. For the comfort of the user, this region is commonly comprised of a low-density foam, or other material designed to minimize agitation of the user's skin. However, this low-density region may be subject to a greater degree of wear than other components on the HMD given its repetitive exposure to friction, oils, and/or chemicals on a user's face. Moreover, the users may wish to use facial interface with different colors or design based on the user's preference.

SUMMARY

Embodiments relate to a facial interface in a HMD. The facial interface assembly includes three separate layers of various materials that are contoured to assemble into a removable facial interface that may be replaced. The facial interface assembly is composed of a periphery frame, a semi-rigid frame, and facial interface foam. These three layers are of varying rigidity, and support contours designed to fit together to interface with a user's face comfortably.

DETAILED DESCRIPTION

In the following description of embodiments, numerous specific details are set forth in order to provide more thorough understanding. However, note that the embodiments may be practiced without one or more of these specific details. In other instances, well-known features have not been described in detail to avoid unnecessarily complicating the description.

Embodiments are described herein with reference to the figures where like reference numbers indicate identical or functionally similar elements. Also in the figures, the left most digit of each reference number corresponds to the figure in which the reference number is first used.

Embodiments relate to a removable facial interface for a head mount display. The removable facial interface includes a periphery frame, a semi-rigid frame and a facial interface foam. The periphery frame and the semi-rigid frame are attached to the facial interface foam to enable the facial interface foam to flex in a manner that encloses both sides of a user's face. The removable facial interface is attached to the head mount display with a tented textile covering the removable facial interface to block external light.

Removable Facial Interface Structure

Figure 1:
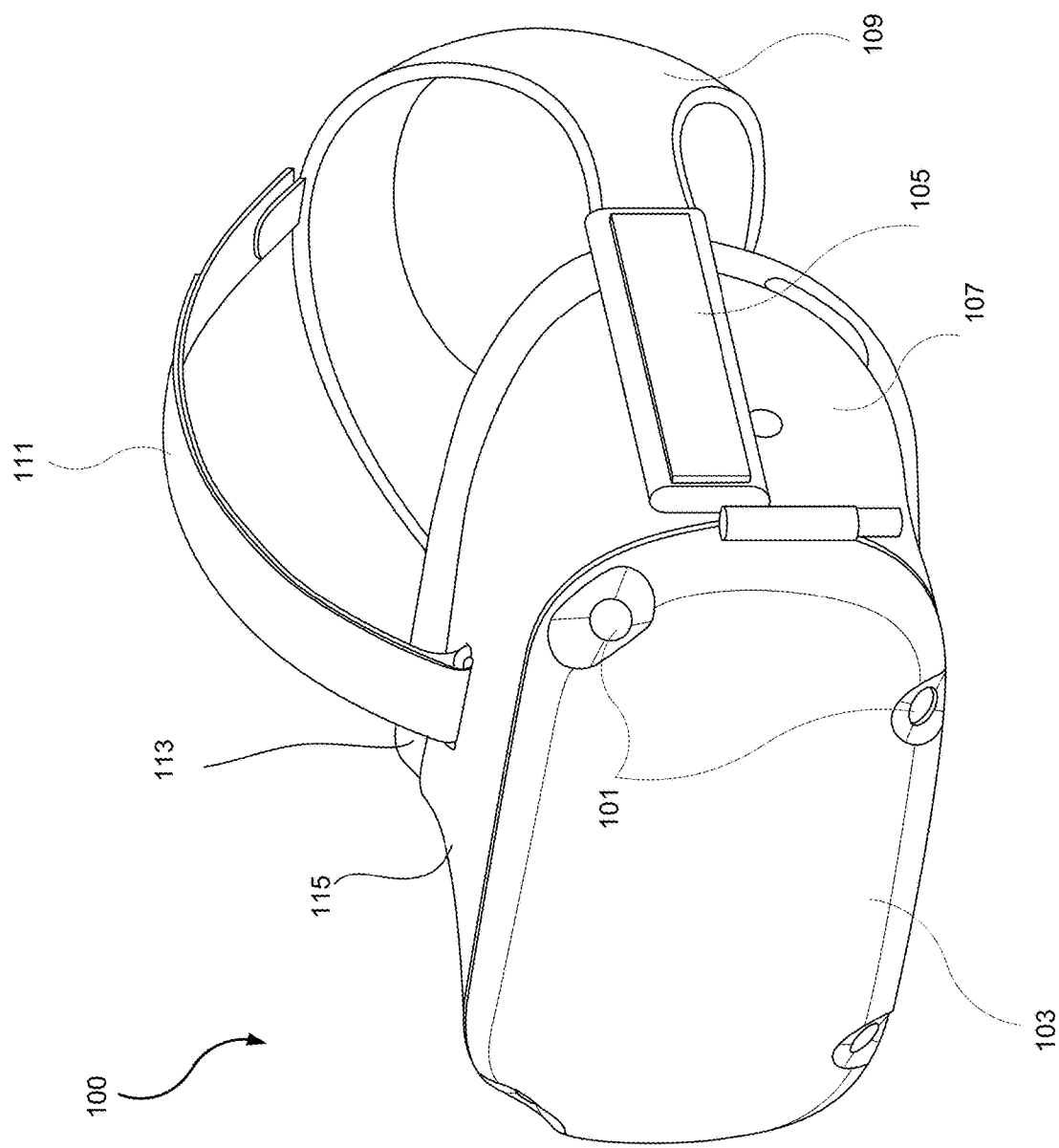
FIG. 1 is a perspective view of a head-mounted display (HMD) according to one embodiment.

FIG. 1 is a perspective view of a HMD 100 according to one embodiment. The HMD 100 may include, among other components, cameras 101, a front cover 103, a head strap connector 105, a main body housing 107, a facial interface assembly 113, a textile cover 115 and a head strap assembly. The head strap assembly may include a rear strap 109, and an upper strap 111 connecting the rear strap 109 to the main body housing 107. The front cover 103 is attached at the front of the main body housing 107. The rear strap 109 is attached to the main body housing 107 via the head strap connector 105. The upper strap 111 is attached to the head strap 109 and secured by inserting the end of the upper strap 111 into a slot formed in the main body housing 107. The front cover 103 covers a front side of the main body housing 107. The facial interface assembly 113 is attached at the back of the main body housing 107. The textile cover 115 covers the main body housing 107 as well as part of the facial interface assembly 113. The components and the structure of HMD 100 as illustrated in FIG. 1 are merely illustrative.

Figure 2:
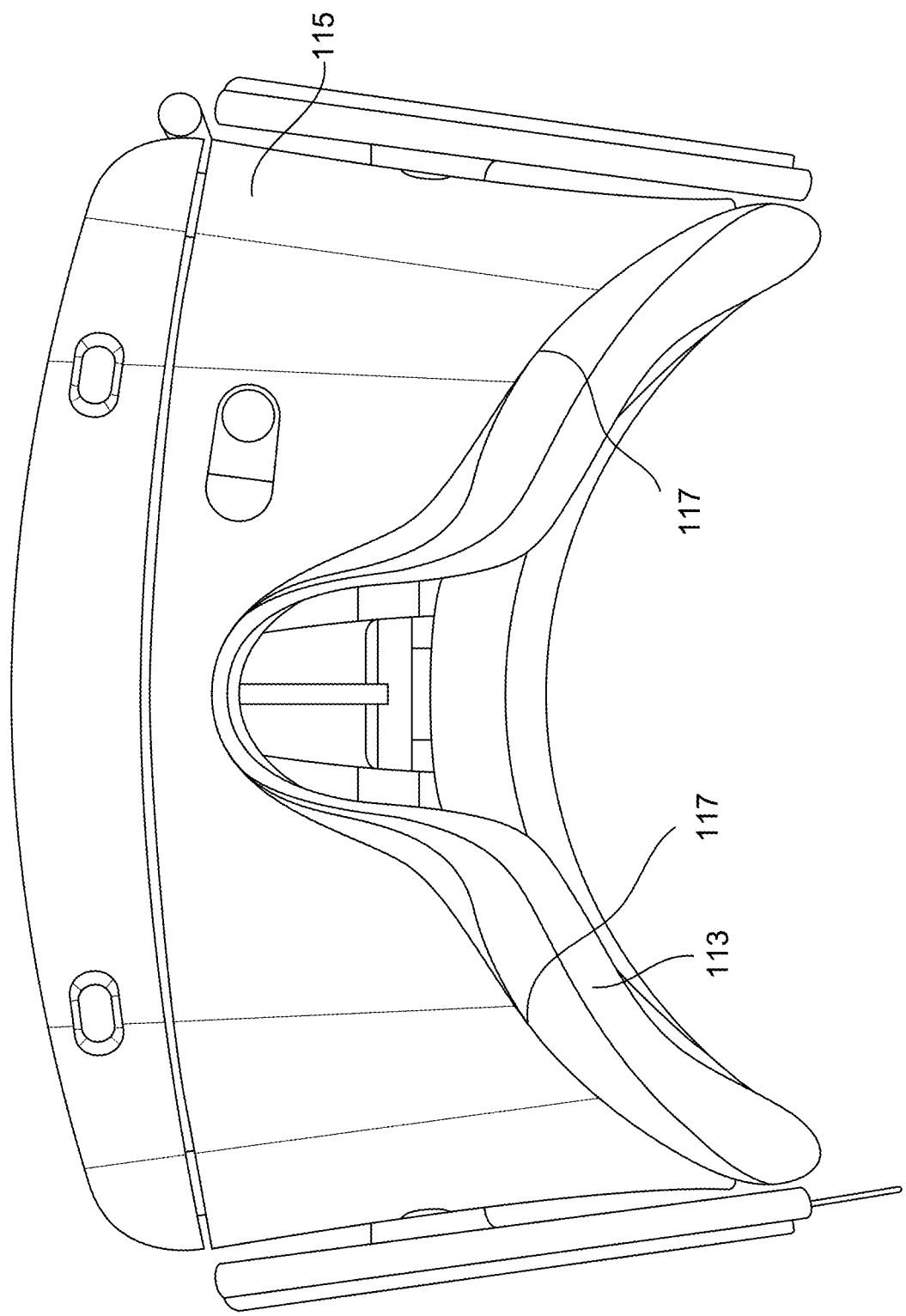
FIG. 2 is a bottom view of the HMD of FIG. 1, according to one embodiment.

The facial interface assembly 113 is attached at the back of the HMD 100 and interfaces with the user's face when the user wears the HMD 100. The facial interface assembly 113 can be removed from the main body housing 107 of the HMD 100 for replacement, as described below in detail with reference to FIG. 3. FIG. 2 is a bottom view of the HMD 100 which illustrates the bottom side of the facial interface assembly 113, according to one embodiment. In the embodiment illustrated in FIG. 2, the facial interface assembly 113 is positioned such that its front surface 117 is flush with the textile cover 115.

The front cover 103 is a rigid member placed at the front part of the HMD 100 to protect components in the HMD 100. In one embodiment, the front cover 103 is secured to the main body housing 107 via screws or other fastening mechanism that enables the front cover 103 to be removed from the main body housing 107 for maintenance purposes. The front cover 103 has two cameras 101 at upper two corners and bottom two edges. These cameras 101 can be used to capture views outside of the HMD 100, and display them to the user.

The head strap 109 and upper strap 111 wrap around a user's head to fasten the HMD 100 to the user's face. The head strap 109 and the upper strap 111 may be made of elastic, fabric or a combination thereof to be flexible yet comfortable for the user. The head strap 109 is connected to the main body housing 107 of the HMD 100 by the head strap connector 105 which can rotate in relation to the main body housing 107. Additionally, the head strap connector 105 can disconnect from the main body housing 107, enabling a user to replace the head strap 109 or a maintenance technician easier access to the main body housing 107. The upper strap 111 provides additional support and is connected to the head strap 109 and the top of the main body housing 107.

The textile cover 115 covers the main body housing 107 and extends to the facial interface assembly 113 to prevent external light from penetrating into space between the facial interface assembly 113. The textile cover 115 may be removed from the main body housing 107 for replacement. The textile cover 115 may be replaced either for practical reasons (e.g., wear and tear in the used textile cover 115) or for aesthetic reasons (e.g., color or pattern preference). In one embodiment, the textile cover 115 is attached to the facial interface assembly 113 so that the textile cover 115 can be removed with the facial interface assembly 113.

Figure 3:
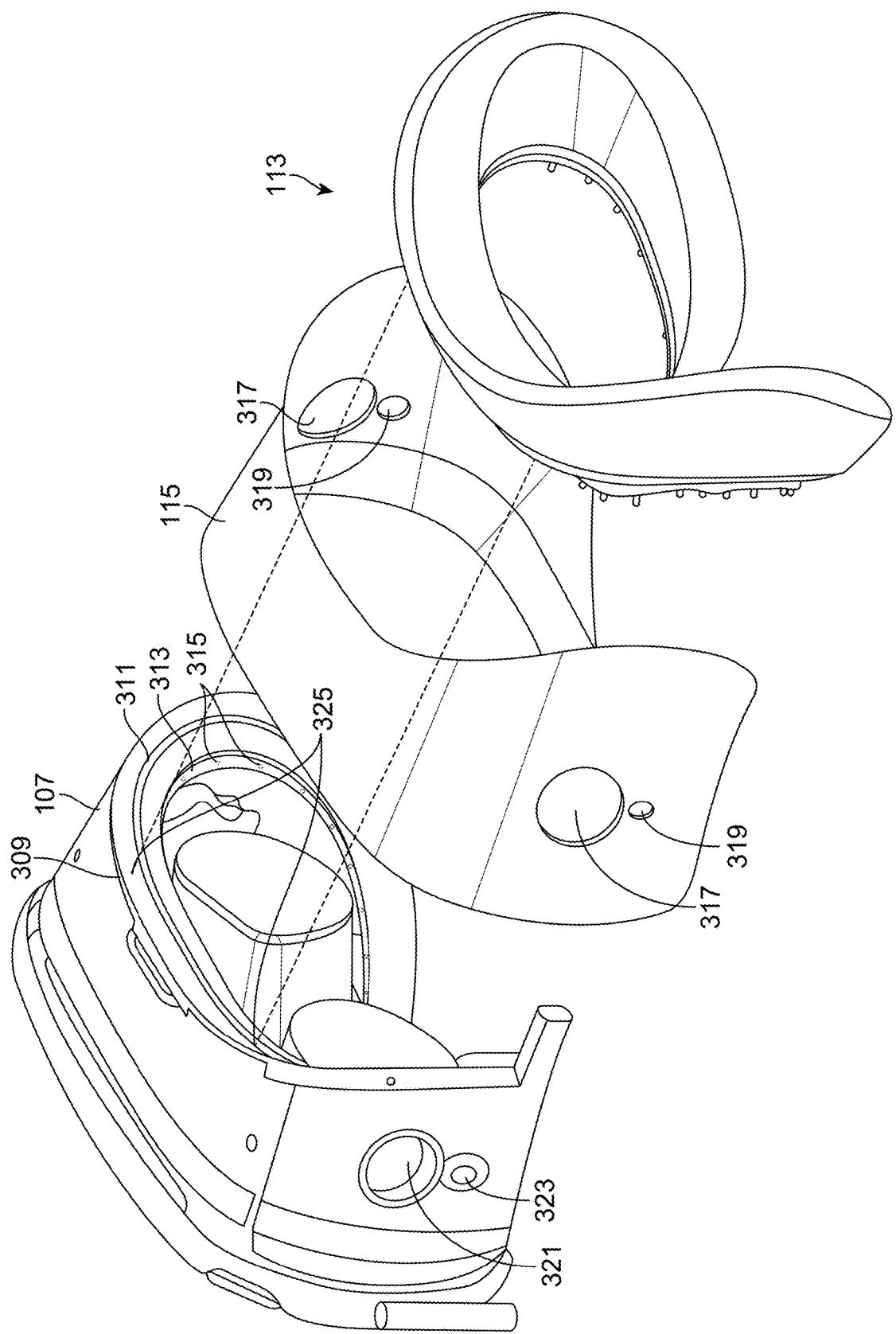
FIG. 3 is an exploded view of the HMD of FIG. 1, according to one embodiment.

FIG. 3 is an exploded view of HMD 100, according to one embodiment. In the embodiment illustrated in FIG. 3, the HMD 100 has been disassembled to illustrate a rear frame 309, a rear frame lip 311, an inner ring coupling 313, and inner ring coupling slots 315 within the main body 107. The textile cover 115 covers the main body housing 107, extending to the facial interface assembly 113 to block external light from entering the main body housing 107. The textile cover 115 also includes two head strap connector holes 317 that provide access to two head strap connector mounts 321 used to mount the head strap connector 105 to the HMD 100. In addition, the textile cover 115 includes two audio jack holes 319 that provide access to the audio jacks 323 on the main body housing 107 of the HMD 100.

The rear frame 309 is located along the outer rim of the main body housing 107 on the opposite end of the front cover 103. The rear frame 309 includes a rear frame lip 311 that provides an indentation into which a rib 421 located on the semi-rigid frame 415 (e.g., shown in FIG. 4) connects the facial interface assembly 113 to the main body housing 107.

The inner ring coupling 313 is a thin ring suspended within the rear frame lip 311 that contains several inner ring coupling slots 315. The inner ring coupling slots 315 are aligned with the pins 419 (e.g., shown in FIG. 4) on the periphery frame 413 within the facial interface assembly 113 such that the inner ring coupling slots 315 provide a coupling between the facial interface assembly 113 and the main body housing 107, securing the facial interface assembly 113 to the main body housing 107.

Figure 4:
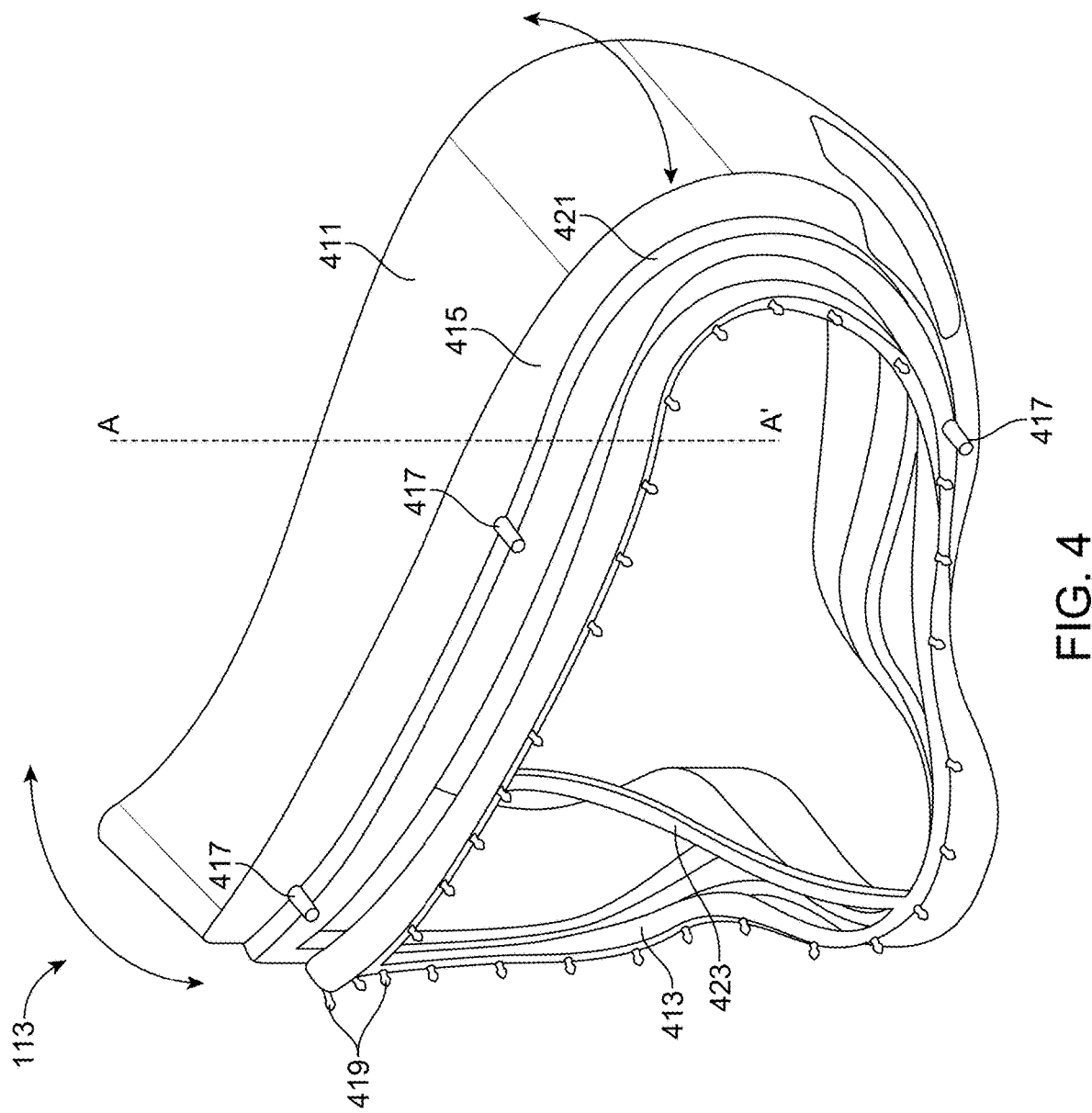
FIG. 4 is a perspective view of a facial interface assembly in the HMD of FIG. 1, according to one embodiment.

FIG. 4 is a perspective view of the facial interface assembly 113, according to one embodiment. As shown in FIG. 4, the periphery frame 413 is shaped to align with the front contour of the semi-rigid frame 415, and the semi-rigid frame 415 is shaped to align with the facial interface foam 411. The facial interface foam 411 is contoured to contact a user's face.

Figure 5:
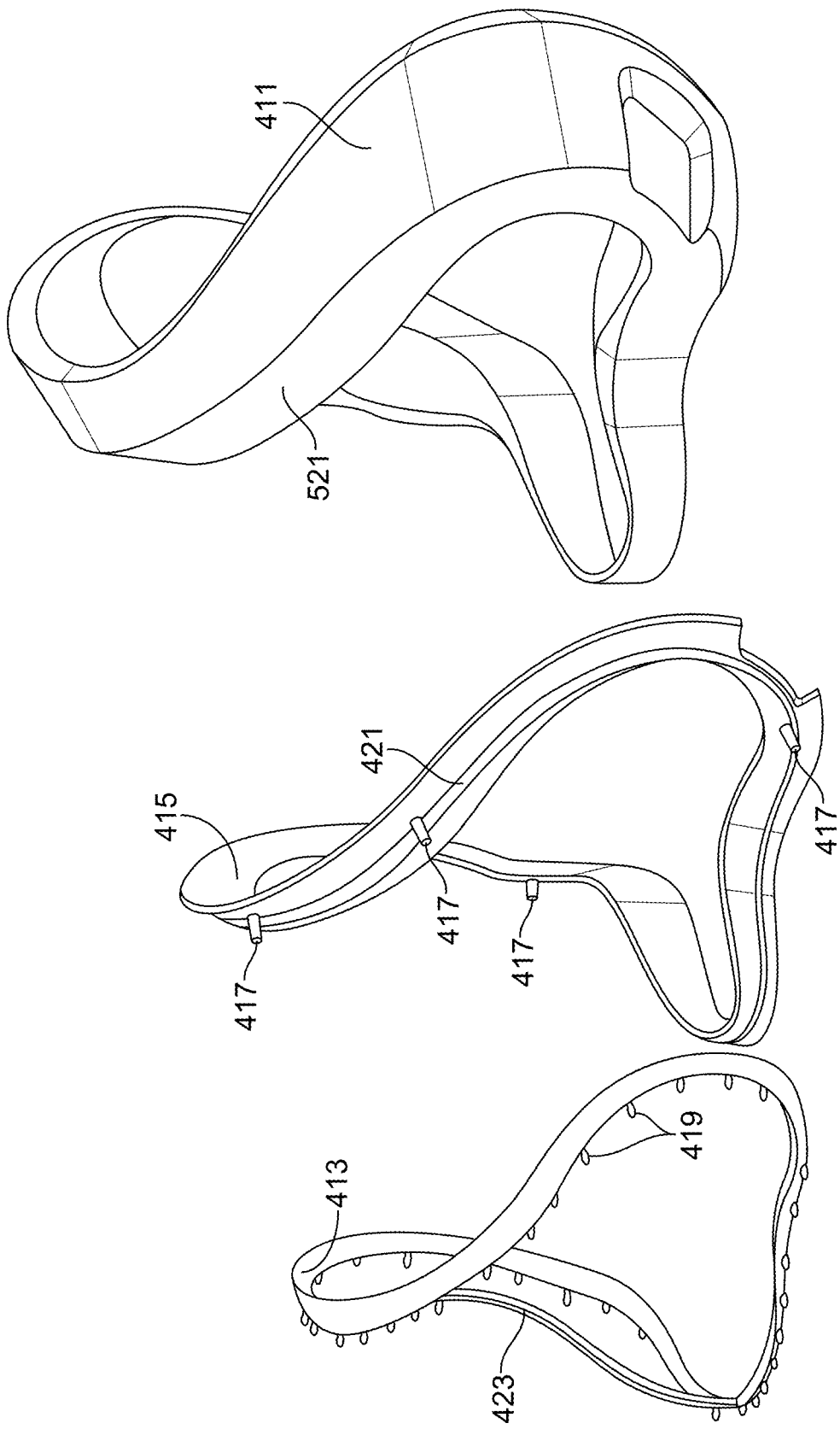
FIG. 5 is an exploded view of the facial interface assembly of FIG. 4, according to one embodiment.

FIG. 5 is an exploded view of the facial interface assembly 113, according to one embodiment. In the embodiment shown in FIG. 5, the facial interface assembly 113 includes three separate components: a periphery frame 413, a semi-rigid frame 415, and facial interface foam 411. The periphery frame 413 is contoured to fit within the semi-rigid frame 415. The semi-rigid frame 415 guides the facial interface foam 411 relative to the A-A' axis as it flexes (e.g., shown in FIG. 4), and provides a restoring force that allows the facial interface foam 411 to recover its shape after it has been displaced by the user. The facial interface foam 411 is designed to flex relative to the A-A' axis when making contact with a user's face during use.

The periphery frame 413 shown in FIG. 5 includes pins 419 and a frame bridge 423. The pins 419 protrude forward from the periphery frame 413 around the frame's perimeter, and are used to attach the periphery frame 413 to the rear frame 309, which contains several inner ring coupling slots 315 for receiving the pins 419. The frame bridge 423 provides the periphery frame 413 with structural support along the frame's edges.

The semi-rigid frame 415 shown in FIG. 5 includes several auxiliary attaching pins 417 positioned along the crest of a rib 421 that forms an elevated median along the face of the semi-rigid frame 415. As shown in FIG. 3, the auxiliary attaching pins 417 align with auxiliary attaching pin holes 325 located on the rear frame 309 on the main body housing 107. The auxiliary attaching pin holes 325 receive the auxiliary attaching pins 417 to secure the semi-rigid frame 415, as well as the entire facial interface assembly 113, to the main body housing 107 of the HMD 100.

The facial interface foam 411 is a low-density foam contoured to make physical contact with a user's face. In FIG. 5, the facial interface foam 411 includes a rim 521 that aligns with the back face of the semi-rigid frame 415, positioning the facial interface foam 411 flush against the semi-rigid frame 415 when the facial interface assembly 113 is assembled. Because the facial interface foam 411 makes physical contact with a user's face, it may be more subject to wear than the surrounding components (e.g., semi-rigid frame 415 and periphery frame 413). In one embodiment, the facial interface foam 411 is replaceable and may be removed independently of the surrounding components. In another embodiment, all three components (e.g., facial interface foam 411, semi-rigid frame 415, and periphery frame 413) must be replaced collectively.

The foregoing description of the embodiments of the disclosure has been presented for the purpose of illustration; it is not intended to be exhaustive or to limit the disclosure to the precise forms disclosed. Persons skilled in the relevant art can appreciate that many modifications and variations are possible in light of the above disclosure.

What is claimed is:

1. A head-mounted display, comprising:
   a main body housing defining at least part of an outer surface of the head-mounted display; and
   a facial interface assembly attached to at a rear portion of the main body housing in a removable manner, the facial interface assembly comprising:
      a facial interface foam contoured to contact a user's face when the head-mounted display is worn by the user,
      a semi-rigid frame attached around a rim of the facial interface foam, the semi-rigid frame more rigid than the facial interface foam to provide a restoring force against deformation of the facial interface foam, the semi-rigid frame separated from the user's face by the facial interface foam when the head-mounted display is worn by the user, and
      a periphery frame attached to the semi-rigid frame, the periphery frame having integrated pins for removably attaching the facial interface assembly to the main body housing.

2. The head-mounted display of claim 1, further comprising a textile cover on the main body housing, the textile cover extending to the facial interface assembly to block external light.

3. The head-mounted display of claim 1, wherein the periphery frame is shaped to align with a front contour of the semi-rigid frame and a rib connecting a portion of the periphery frame with another portion of the periphery frame.

4. The head-mounted display of claim 3, wherein the integrated pins protrude forward from the periphery frame.

5. The head-mounted display of claim 1, wherein the main body housing includes a rear frame formed with holes for receiving the integrated pins.

6. The head-mounted display of claim 1, wherein the semi-rigid frame has a rib extending along a front surface of the semi-rigid frame.

7. The head-mounted display of claim 1, wherein the semi-rigid frame further comprises auxiliary attaching pins protruding from a front surface of the semi-rigid frame.

8. The head-mounted display of claim 6, wherein the main body housing includes a rear frame formed with a line of groove for receiving the rib and auxiliary attaching pins of the semi-rigid frame.

9. A facial interface assembly for a head-mounted display, comprising:
- a facial interface foam contoured to contact a user's face when the head-mounted display is worn by the user;
- a semi-rigid frame attached around a rim of the facial interface foam, the semi-rigid frame more rigid than the facial interface foam to provide a restoring force against deformation of the facial interface foam, the semi-rigid frame separated from the user's face by the facial interface foam when the head-mounted display is worn by the user; and
- a periphery frame attached to the semi-rigid frame, the periphery frame having integrated pins for removably attaching the facial interface assembly to a main body housing of the head-mounted display, the main body housing defining at least part of an outer surface of the head-mounted display and configured to directly connect to a head strap assembly.

10. The facial interface assembly of claim 9, wherein the periphery frame is shaped to align with a front contour of the semi-rigid frame and a rib connecting a portion of the periphery frame with another portion of the periphery frame.

11. The facial interface assembly of claim 10, wherein the integrated pins protrude forward from the periphery frame.

12. The facial interface assembly of claim 9, wherein the main body housing includes a rear frame formed with holes for receiving the integrated pins.

13. The facial interface assembly of claim 9, wherein the semi-rigid frame has a rib extending along a front surface of the semi-rigid frame.

14. The facial interface assembly of claim 9, wherein the semi-rigid frame further comprises auxiliary attaching pins protruding from a front surface of the semi-rigid frame.

15. The facial interface assembly of claim 9, wherein the main body housing includes a rear frame formed with a line of groove for receiving a rib and auxiliary attaching pins of the semi-rigid frame.

* * * * *